Dec. 2, 1969     R. J. SCHULTZ     3,481,348
BOTTLE RINSING MACHINE
Filed Oct. 24, 1966     3 Sheets-Sheet 1
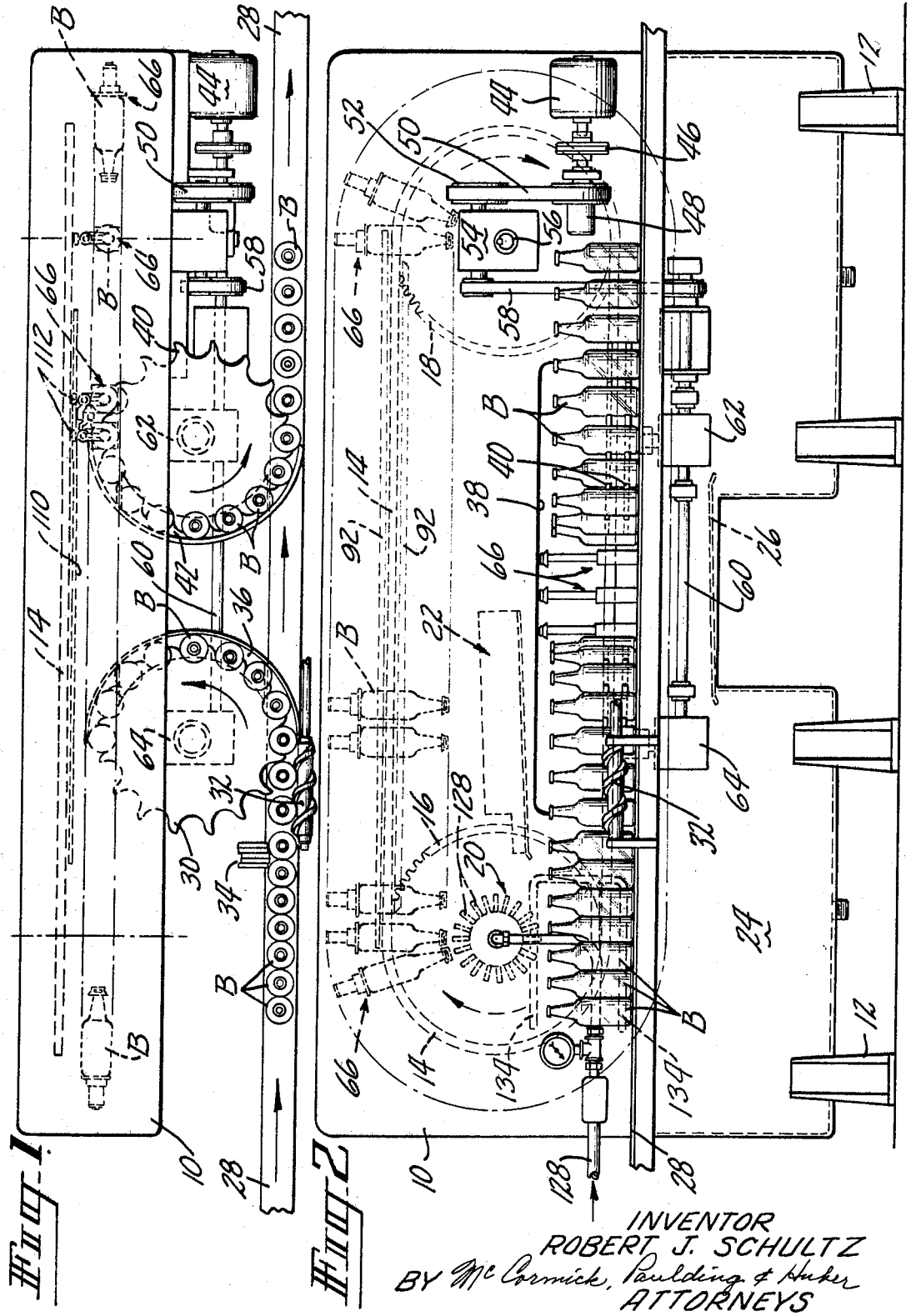
INVENTOR
ROBERT J. SCHULTZ
BY McCormick, Paulding & Huber
ATTORNEYS

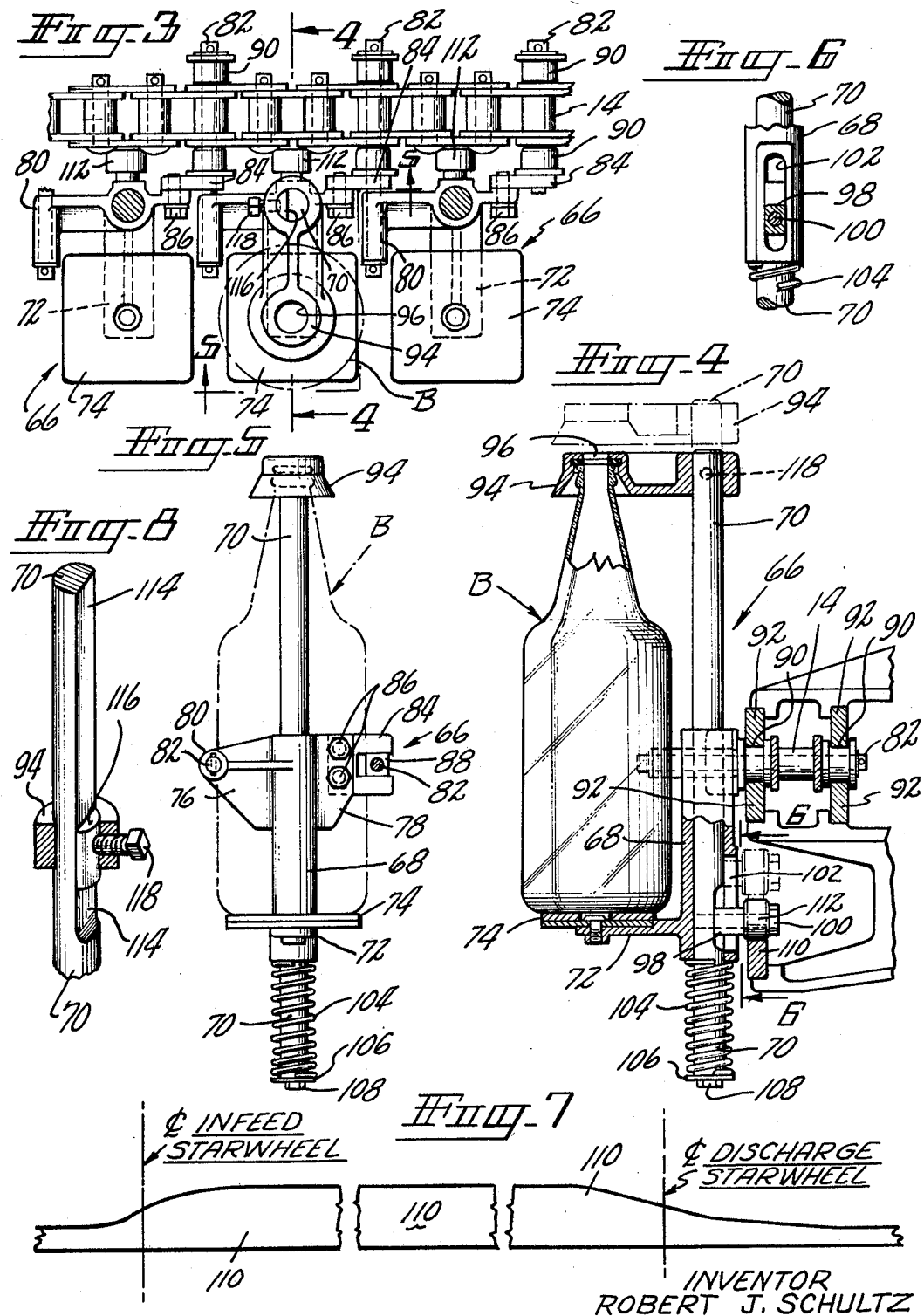

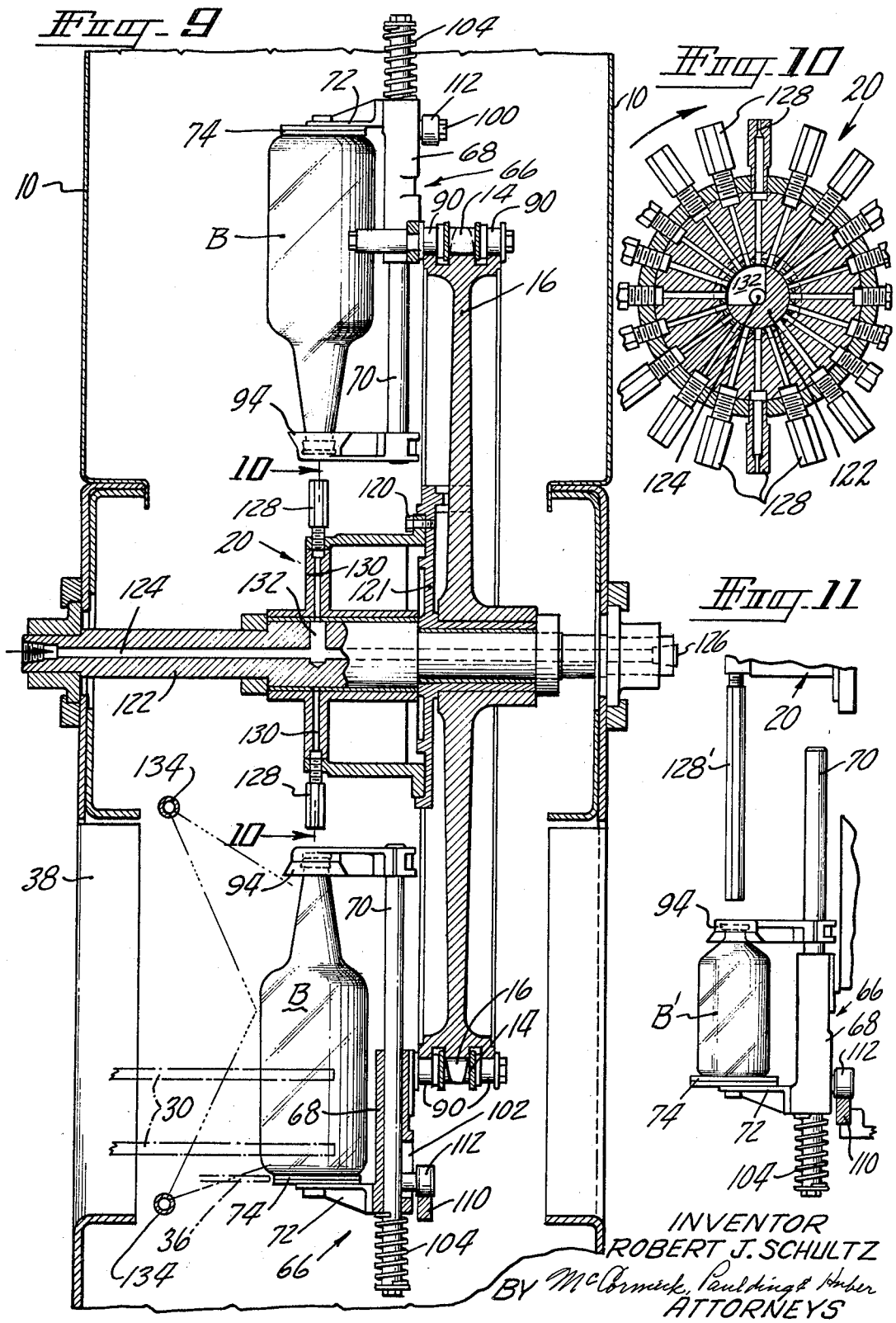

United States Patent Office 3,481,348
Patented Dec. 2, 1969

3,481,348
BOTTLE RINSING MACHINE
Robert J. Schultz, Portland, Conn., assignor to Emhart Corporation, Bloomfield, Conn., a corporation of Connecticut
Filed Oct. 24, 1966, Ser. No. 588,996
Int. Cl. B08b 3/00, 1/00
U.S. Cl. 134—126                                8 Claims

ABSTRACT OF THE DISCLOSURE

A bottle rinsing machine comprising an endless link chain conveyor having brackets at the side to support the bottles for movement in a vertical plane. The bottles are swept onto the conveyor before movement around a wheel where they are rinsed, and they are swept off the conveyor after movement around a second wheel.

---

This invention relates to improvements in a rinsing machine for glassware articles such as bottles or the like.

As will be described more particularly, the machine of this invention features the use of an endless conveyor chain which is entrained over and driven by sprocket wheels so that it operates in a generally vertical plane. The conveyor has a series of article carriers spaced throughout its length which are adapted to releasably support the bottles or other articles and to carry them through a substantial portion of one revolution or cycle of the belt wherein the articles are initially carried in an upright position, then an inverted position, and then returned to the upright position. A rinser wheel is operatively associated with one oft he sprocket wheels, and it has a plurality of nozzles which introduce water, steam or any other rinsing fluid to the interiors of the articles being carried by the conveyor around the associated sprocket wheel from the upright to the inverted position.

A first sweep mechanism comprising a starwheel or pocket wheel moves the articles from an infeed conveyor onto the machine conveyor carriers in the lower horizontal pass of the machine conveyor. A second sweep mechanism comprising another starwheel removes the articles from the said lower pass of the machine conveyor at a position upstream from the first sweep mechanism, and the said second sweep mechanism is used to discharge the rinsed articles onto a discharge conveyor or a downstream extension of the infeed conveyor.

It is the general object of the invention to provide a rinsing machine of the aforedescribed type which is of relatively simple construction and which has carrier devices which provide for a good distribution of the article load and for smooth operation thereof over a long life.

The drawings show a preferred embodiment of the invention and such embodiment will be described, but it will be understood that various changes may be made from the construction disclosed, and that the drawings and description are not to be construed as defining or limiting the scope of the invention, the claims forming a part of this specification being relied upon for that purpose.

Of the drawings:

FIG. 1 is a plan view of a bottle rinsing machine constructed in accordance with the present invention;

FIG. 2 is a front elevational view of the machine shown in FIG. 1;

FIG. 3 is a plan view of a section of the endless transport chain or conveyor chain in the machine with associated article carriers;

FIG. 4 is a vertical view largely in section and taken as indicated generally by the line 4—4 of FIG. 3;

FIG. 5 is a further vertical view of one of the carriers taken as indicated generally by the line 5—5 of FIG. 3;

FIG. 6 is a further vertical sectional view of a detail of the carrier construction taken as indicated by the line 6—6 of FIG. 4;

FIG. 7 is a schematic view showing the control or actuator cam for the retaining means of the carriers;

FIG. 8 is a perspective view partly in section to illustrate the adjustability of the retaining means of a carrier;

FIG. 9 is an enlarged vertical sectional view taken through one of the sprocket wheels of the machine conveyor on its axis and illustrating the associated rinser wheel;

FIG. 10 is a schematic vertical sectional view taken through the rinser wheel transversely of its axis; and FIG. 11 is an elevational view illustrating the adaptability of the rinser wheel and carriers for the handling of glassware articles of different height and size.

Referring at first to FIGS. 1 and 2, it will be seen that the rinsing machine includes a generally rectangular cabinet 10 supported on the floor by legs 12, 12. The principal machine elements disposed within the cabinet 10 include an endless chain or bottle transport conveyor 14 which moves in a vertical plane, being entrained over left-hand and right-hand sprocket wheels 16 and 18 (FIG. 2) which rotate on horizontal axes extending transversely of the cabinet. The said sprocket wheel axes reside substantially in the same horizontal plane and thus the endless chain or conveyor 14 has a lower generally horizontal pass and an upper generally horizontal pass extending between the sprocket wheels.

The said lower horizontal pass is at about a convenient table height from the floor, and glassware articles such as the bottles B, B are fed to this pass of the conveyor chain to be carried thereby in a generally clockwise direction as viewed in FIG. 2 around the sprocket wheel 16 and then around the sprocket wheel 18 before being returned on the said lower horizontal pass from which they are then removed. The bottles B, B are initially engaged on the lower pass of the conveyor chain in an upright position, and then as they are carried around the sprocket wheel 16 to an inverted position, a rinsing fluid is injected into their interiors by a rinser wheel 20 in a manner which will be more specifically described. The rinser wheel 20 is coaxial with the sprocket wheel 16 and rotates therewith so as to inject the rinsing fluid in each bottle until it reaches substantially a fully inverted position at the top of the sprocket wheel 16.

Then, as the bottles move along the upper horizontal pass of the conveyor chain 14, the fluid flows from them and drops into a drain pan 22. As shown in FIG. 2, the drain pan is supported within the cabinet 10 in a somewhat tilted position so that the fluid will flow from it over the bottles as they move on the lower pass around the sprocket wheel 16 to wash the outside of the bottles. The rinsing liquid then drops into a reservoir section 24 in the left-hand portion of the cabinet as viewed in FIG. 10, and a drain plate 26 directs most of the balance of the rinsing liquid in the cabinet toward the said reservoir.

As also shown in FIGS. 1 and 2, the bottles B, B are introduced to the machine on a horizontal infeed conveyor 28 which moves from left to right at the front of the machine. This same conveyor can be used as shown to remove bottles discharged from the machine, or a separate discharge conveyor can be employed.

A sweep mechanism comprising a starwheel or pocket wheel 30 is employed for transferring the bottles from the infeed conveyor 28 onto the lower horizontal pass of the endless chain 14. More specifically, the bottles are fed in sequence and in timed relationship to the starwheel 30 by means of a driven rotating horizontal worm 32, the said bottles being moved into engagement with the worm by spring fingers 34. Thus, the bottles are properly spaced apart to be engaged by the starwheel 30 which is rotated on a vertical axis in a counterclockwise direction as viewed in FIG. 1. The said starwheel moves the bottles over an arcuate deadplate 36 to reverse their direction of horizontal movement from left to right on the conveyor 28 to right to left on the lower pass of the conveyor chain 14. A horizontal opening 38 is provided in the cabinet 10 at the table height of the conveyor 28 to accommodate movement of the bottles onto and off of the lower pass of the endless chain 14.

It will be noted that the horizontal starwheel 30 is located near the left-hand vertical sprocket wheel 16. It will also be noted that there is a second sweep mechanism comprising a second similar starwheel 40 located near the right-hand sprocket wheel 18. The starwheel 40 is driven on a vertical axis in a counterclockwise direction as viewed in FIG. 1 to sweep bottles which have been rinsed from the lower pass of the endless chain 14 back onto the conveyor 28 or onto a separate discharge conveyor. Thus, it can be said that the second sweep mechanism is located upstream from the first sweep mechanism along the lower pass of the conveyor chain 14. Like the first sweep structure, the starwheel 40 is associated with an arcuate deadplate 42 for moving the rinsed bottles away from the conveyor chain 14 through the cabinet opening 38 and out to the front thereof. In so doing the direction of movement of the bottles is reversed from right to left into left to right movement.

In order to assure timed operation of the first starwheel 30, the worm 32, the endless chain 14 and the second starwheel 40, they are provided with a common drive from a single drive motor 44. The output of the drive motor 44 is connected through a clutch 46 to the drive pulley 48 of a timing belt 50 which drives a pulley 52 connected to the input shaft for a speed reducer or gear box 54. One output shaft 56 from the said gear box comprises the shaft upon which the right-hand sprocket wheel 18 is mounted whereby to drive the endless chain conveyor 14 over that sprocket and the sprocket 16. Another output shaft from the speed reducer 54 is connected by a timing belt 58 and suitable pulleys to drive a lower horizontal shaft 60 which extends longitudinally of the machine cabinet 10 in the front thereof and below the infeed conveyor 28. This shaft extends through a gearbox 62, including suitable gearing for driving the second starwheel 40, into another gearbox 64 for driving the first starwheel 30. A still further output from the speed reducer 54, which is not shown, is connected to the shaft of the worm 32 to drive it in timed relationship with the two starwheels and with the two sprocket wheels for the endless chain 14.

Movement of the bottles into and out of the machine in timed relationship to operation of the endless chain 14 is essential because the bottles are to be placed on and moved through a rinsing cycle by carriers which are secured to and spaced along the chain 14. The carrier structure is best shown in FIGS. 3–8 wherein each carrier is designated generally by the reference number 66. As shown in FIGS. 3 and 4, and also in FIG. 1, the carriers 66, 66 are attached at one side of the endless link chain 14 so as to project toward the front of the machine cabinet 10.

Looking at each carrier from the front as viewed in FIG. 5, it will be seen to include a tubular vertical bracket 68 having a vertical bore for slidably receiving a rod 70. A forwardly projecting arm 72 is provided on the bracket 68 near its bottom end to detachably secure a substantially square plate 74 in a horizontal position, the said plate providing a platform or base for supporting a bottle B or other article of glassware in an upright position. The bracket 68 is secured to the chain 14 by means of laterally extending vertical flanges 76 and 78 provided at its upper end. The left-hand flange 76 has a forwardly projecting journal 80 formed thereon to receive the forwardly projecting end of an elongated pin 82 which extends through one of the rollers of the link chain 14 and thus constitutes one of the link pins thereof. The right-hand flange 78 on the carrier bracket 68 secures a bifurcated member 84 as by cap screws 86, 86. The bifurcated member 84 defines a horizontal slot to accommodate sliding movement of a rectangular block 88 which rotatably embraces the next adjacent bracket support pin 82. Thus, each bracket 68 is supported on two of the pins 82, 82, both of which are permitted limited rotational movement relative to the bracket and the right-hand one of which is permitted limited sliding movement relative to the bracket as well as the rotational movement. This relative rotational and sliding movement is provided to permit the chain 14 to carry each bracket around the sprocket wheels 16 and 18 in the endless path of movement of the said chain.

The chain 14 is supported along its upper and lower horizontal passes to prevent sagging and twisting caused by the weight of the carriers 66, 66 in order to assure proper positioning of the brackets 68, 68 with their bores vertical for vertical support of the rods 70, 70. This is accomplished by providing rollers 90, 90 on each elongated chain link and bracket support pin 82 adjacent the chain 14 at the front and rear sides thereof. These rollers ride upon elongated horizontal guide bars 92, 92 which are shown in FIGS. 2 and 4 and which extend longitudinally of the machine cabinet 10 and are suitably supported therein. As seen in FIG. 4, there are a pair of upper guide bars 92, 92 engaging the top of each roller 90, and a similar pair of lower guide bars 92, 92 is arranged to engage the bottoms of the rollers 90, 90.

The rod 70 is slidable vertically and biased downwardly in the bore of the bracket 68 to bring retaining means into engagement with a bottle on the base. This retaining means comprises a forwardly projecting arm 94, which is adjustably secured to the upper end portion of the said rod. Thus, each bottle on each carrier 66 is supported at the top and at the bottom so that it can be carried in movement of the chain 14 around the sprocket wheels 16 and 18 from an upright position to an inverted position and then back to the upright position.

As seen in FIG. 4, the forwardly projecting end of the arm 94 is shaped to complement the top shape of the bottle B so as to engage the same firmly, and the said shaped portion of the arm is provided with an opening 96 which registers with the opening of the bottle to accommodate the passage of a jet of rinsing fluid directed into the bottle opening. It will be understood that the shape of the article engaging portion of the arm 94 will vary with different glassware articles.

In FIG. 4 the downwardly biased bottle engaging position of the arm 94 and the rod 70 relative to the bracket 68 is shown in solid lines, and the elevated position is shown in broken lines. The said arm and rod are in the elevated position to permit the starwheel 30 to place a bottle on the associated base 74 of the carrier and the elevated position is needed to permit the starwheel 40 to remove a bottle from the carrier. The limit of sliding movement of the rod 70 in the bore of the bracket 68 is fixed by a rectangular block 98 which is secured to the rod 70 to project rearwardly thereof by a screw 100, and the block 98 slides within a vertical slot 102 provided in the rear face of the bracket 68.

A coiled compression spring 104 surrounds that portion of the rod 70 which projects below the bracket 68 and it is seated between the bottom of the bracket and a collar 106 secured to the bottom end of the rod 70 as by a cap screw 108. This spring, obviously, biases the rod 70 and the arm 94 downwardly to engage and force the arm against the top of the bottle. The rod and arm are elevated by cam means comprising an elongated bar cam 110 (FIGS. 1, 4 and 7) which extends horizontally and longitudinally in the machine cabinet 10 forwardly of the chain 14. A cam following roller 112 on the rear end portion of the screw 100 rides along the top edge of the cam bar 110, and when it rides up the right-hand slope of said edge (FIG. 7) at the area where the discharge starwheel 40 is located, the rod 70 and thus the arm 94 are elevated to disengage the said arm from the top of the carried bottle B. This permits the discharge starwheel 40 to remove the bottle from the carrier. The arm and rod remain elevated as the cam following roller 112 moves along the cam bar 110 until it reaches the left-hand slope of said bar in the area adjacent the infeed starwheel 130. This will have permitted the said infeed starwheel to place another bottle on the carrier for rinsing.

The arm 94, as previously mentioned, is adjustably secured to the top end portion of the rod 70 to accommodate articles of glassware of various height. The means of adjusting the said arm relative to the rod is shown in FIG. 8 wherein it will be seen that the upper end portion of the rod 70 is provided with a flat 114 which is engaged by a jam plate 116. A screw 118 is threaded into that portion of the arm 94 surrounding the rod 70 to force the jam plate 116 against the flat 114 at adjusted vertical positions of the arm. When the screw 118 is loosened, the arm 94 can easily be shifted vertically and then tightened in adjusted position by tightening the said screw. In all vertical positions, the arm 94 projects forwardly for proper registry with the top of the article of glassware, and the said arm cannot be rotated relative to the rod 70.

Turning now to the construction and operation of the rinser wheel 20, reference is made especially to FIGS. 2 and 9–11. As shown in FIG. 9, the rinser wheel 20 is secured to the sprocket wheel 16 for rotation therewith as by a series of circumaxially spaced cap screws 120 connected to a drive plate 121 which is in turn suitably adjustably connected to the spokes of the sprocket wheel. The sprocket wheel 16 and the rinser wheel 20 utilize a common, non-rotating shaft 122 which is supported in the front and rear walls of the cabinet 10. The said shaft has a central bore 124 which is closed at the rear by a plug 126 and which is connected at the front of the cabinet as shown in FIG. 2 to piping 128 extending from a pressurized source of water, steam or other suitable rinsing fluid. The rinsing wheel per se, as shown in FGS. 9 and 10, comprises a circumaxially spaced series of nozzles 128, 128 connected through radial ports or passages 130, 130, to an approximately 90° segmental radial passage 132 communicating with the bore 124 in the shaft 122. The passage 132 within the shaft 122 is arranged to introduce the rinsing fluid under pressure to the nozzles 128, 128 as the rinsing wheel 20 rotates from the nine o'clock position to the twelve o'clock position for each nozzle during clockwise rotation of the said wheel as viewed in FIGS. 2 and 10. Thus, rinsing fluid is injected under pressure to each bottle as it is moved from a horizontal position to the inverted position while being carried by the chain 14 in a clockwise direction around the sprocket wheel 16. It will be seen and understood from FIG. 9 that a nozzle 128 is arranged on the rinsing wheel 20 to be associated with a bottle B on a carrier 66 carried by the link chain 14. That is, there will be one nozzle 128 provided for each bottle B on the chain 14 as the said carrier is passed around the sprocket wheel 16. It will also be seen in FIG. 9 that a nozzle 128 associated with a bottle B is spaced from the open end of the said bottle so that a jet of fluid being introduced to the bottle will pass through the opening 96 in the carrier support arm 94 which engages the open end of the bottle.

The outside of each bottle is also washed by a spray from piping 134 (FIGS. 2 and 9) in addition to the drain fluid being returned to the reservoir. The piping can be connected to the same source as that supplying fluid for rinsing the bottle interior, or to another source if desired.

As has heretofore been mentioned, the machine of this invention is adapted to be operated with bottles and other articles of glassware of different height. FIGS. 1 through 10 illustrate the construction and arrangement of the machine for operation on relatively long narrow-neck bottles. FIG. 11 shows an adaptation of the rinser wheel 20 for use with bottles which are shorter. That is, the bottle B' shown in FIG. 11 is substantially shorter than the bottle B. In this case, a much longer nozzle 128' is substituted for the nozzle 128 to bring it into the desired spaced relationship with the opening of the bottle B'.

Since many of the parts of this machine are subjected to water and other liquids which can be used for rinsing, it is desirable to use a plastic material in the construction of such parts to avoid rusting, warpage, etc. One suitable commercially available plastic material is known as "Lexon No. 101." This material is desirable for use as the base 74, the block 98, the roller 112, the rollers 90, 90, and the arm 94 as well as any other elements which can be wetted by the rinsing liquid or fluid.

The invention claimed is:

1. A rinsing machine for articles of glassware or the like comprising an endless conveyor entrained over wheels and operating in a generally vertical plane with at least a lower portion of its path being horizontal, a series of article carriers secured to said conveyor in spaced relationship, a first sweep mechanism for moving glassware articles in an upright position onto said carriers moving along said horizontal portion of the conveyor path, a second mechanism for moving the articles off said carriers at a remote location from said first sweep mechanism, a rinser wheel coaxially connected with one of said conveyor wheels between said first and second sweep mechanisms and having a circumaxial series of nozzles connectible with a common source to introduce fluid to the interiors of articles being carried around said one conveyor wheel, the articles being inverted by movement around said one conveyor wheel, and a drain pan disposed to receive fluid from the interiors of said inverted articles and to direct it onto the exteriors of succeeding articles moving toward and around said one conveyor wheel.

2. A rinsing machine as set forth in claim 1 wherein said second sweep mechanism moves the articles off the carriers at a location upstream from said first sweep mechanism on said horizontal portion of the conveyor path.

3. A rinsing machine as defined in claim 2 wherein each article carrier includes retaining means for engaging and disengaging the glassware articles and an actuator is provided to operate the retaining means to engage and disengage the articles in sequence, and wherein the said actuator comprises an elongated cam operable to disengage said retaining means of each carrier at said second sweep mechanism and to hold it in disengaged condition until it reaches said first sweep mechanism.

4. A rinsing machine for articles of glassware or the like comprising an endless conveyor entrained over wheels and operating in a generally vertical plane with at least a portion of its path being horizontal, a series of article carriers secured to said conveyor in spaced relationship and having retaining means for engaging and disengaging the glasware articles, first and second sweep mechanisms for moving articles on and off said carriers along said horizontal path, a rinser structure having nozzle means connectible with a supply to introduce fluid to the interior of the articles being carried by the conveyor, and wherein the conveyor comprises an endless chain and each carrier comprises a bracket supported at the side of the chain by links thereof, a base on said bracket for supporting an upright article, and the retaining means includes an arm slidably supported on the bracket and biased toward engagement with the top of the upright article to retain the same, and wherein an actuator is provided for said retaining means and comprises a cam operable to move said arm out of engagement with an article at said second sweep mechanism and to permit biased movement of the arm into engagement with an article at the first sweep mechanism.

5. The rinsing machine as defined in claim 4 wherein said one horizontal portion is the lower pass of the chain, and said second sweep mechanism moves the articles off the carriers on said pass at a location upstream from said first sweep mechanism.

6. The rinsing machine defined in claim 5 wherein the actuator cam is an elongated bar extending between the locations of said first and second sweep mechanisms.

7. The machine of claim 6 wherein the said arm is adjustable toward and from said base to accommodate articles of different length.

8. A rinsing machine as set forth in claim 5 wherein an infeed conveyor is provided to advance a line of articles to the machine, the first sweep mechanism comprises a starwheel for moving the articles in sequence off said infeed conveyor onto the carriers moving on said pass, and said second sweep mechanism comprises a starwheel for moving articles off said pass upstream of the first sweep mechanism.

References Cited

UNITED STATES PATENTS

| | | | |
|---|---|---|---|
| 745,674 | 12/1903 | Rosmann et al. | 134—128 XR |
| 899,017 | 9/1908 | Arnold | 134—128 XR |
| 1,535,454 | 4/1925 | Crell | 134—128 XR |
| 1,648,743 | 11/1927 | Sheffield | 134—72 |
| 2,811,163 | 10/1957 | Weber et al. | 134—128 XR |
| 2,826,207 | 3/1958 | Krupp et al. | 134—72 XR |
| 3,064,663 | 11/1962 | Sariotti et al. | 134—131 XR |
| 3,097,658 | 7/1963 | Runco | 134—81 |
| 2,634,737 | 4/1953 | Rowe | 134—128 |

FOREIGN PATENTS 1,152,323  8/1963  Germany.

ROBERT L. BLEUTGE, Primary Examiner

U.S. Cl. X.R.

134—128, 131, 170